June 27, 1939. B. FOX ET AL Re. 21,129

APPARATUS FOR EVAPORATING AND DISTILLING

Original Filed Dec. 11, 1931 4 Sheets-Sheet 1

Inventors
B. Fox and
C. Ericson,
By R. S. A. Dougherty,
Attorney

June 27, 1939. B. FOX ET AL Re. 21,129

APPARATUS FOR EVAPORATING AND DISTILLING

Original Filed Dec. 11, 1931 4 Sheets-Sheet 2

Inventors
B. Fox and
C. Ericson.
By R. S. C. Dougherty
Attorney

June 27, 1939. B. FOX ET AL Re. 21,129
APPARATUS FOR EVAPORATING AND DISTILLING
Original Filed Dec. 11, 1931 4 Sheets-Sheet 3
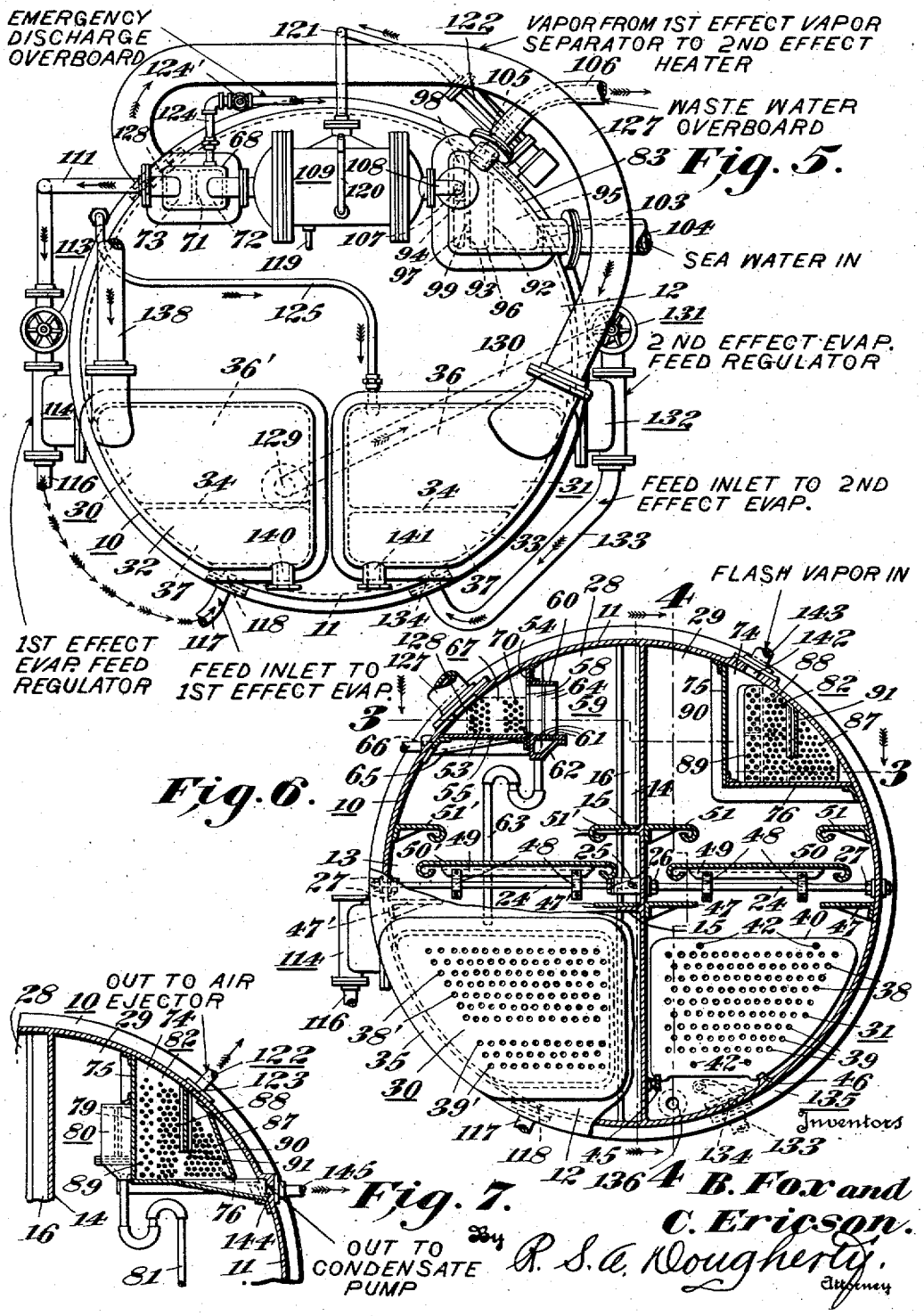
Inventors
B. Fox and
C. Ericson.
By R. S. A. Dougherty,
Attorney June 27, 1939. B. FOX ET AL Re. 21,129

APPARATUS FOR EVAPORATING AND DISTILLING

Original Filed Dec. 11, 1931 4 Sheets-Sheet 4

Inventors
B. Fox and
C. Ericson.
By R. S. A. Dougherty.
Attorney

Reissued June 27, 1939 Re. 21,129

UNITED STATES PATENT OFFICE 21,129

APPARATUS FOR EVAPORATING AND DISTILLING

Benjamin Fox, Wollaston, and Charles E. Ericson, South Braintree, Mass., assignors, by mesne assignments, to Buena Vista Iron Company, a corporation of New Jersey Original No. 2,078,377, dated April 27, 1937, Serial No. 580,286, December 11, 1931. Renewed May 4, 1935. Application for reissue March 28, 1938, Serial No. 198,562

16 Claims. (Cl. 202—174)

This invention relates to an improved apparatus for evaporating and distilling water and more particularly to such apparatus for use on board ships and the like where it is necessary to supply the fresh or pure water demands from sea water. Such demands are occasioned by the losses occurring due to the operation of the ship's machinery, such as condenser, turbine, boiler, auxiliary engines, and the like, together with the ship's human needs, such as drinking water.

Heretofore apparatus of this description has comprised a plurality of units in the way of various-stage evaporators, condensers, feed heaters, separators, distillers, and the like, each constituting, to a more or less degree, an individual unit requiring its own container or casing, together with its piping, and occupying a space by itself. Such an arrangement has been very uneconomical, especially on ships, due to its excessive weight and space requirements, and moreover has been inefficient due to its greater exposure of radiation surface in the individual units and connecting piping. Therefore, it is the especial object of our invention to combine the various necessary units required for the evaporation and distilling of sea water on board ships into and upon a single shell container in such a compact and efficient manner that there ensues as a result a considerable saving in costs, an increased efficiency of operation, and a reduction in the requirements of those two most important factors in ship design—weight and space.

Other objects and advantages will be apparent from the following description, wherein reference is made to the accompanying drawings illustrating the preferred embodiment of our invention and wherein similar reference numerals designate similar parts throughout the several views.

Fig. 5 is a front end elevation thereof.

Fig. 6 is a partial and combined section in which the left half is taken along the line 6—6 of Fig. 2, and the right half is taken along the line 6—6 of Fig. 4.

Fig. 7 is a detail section taken along the line 7—7 of Fig. 3.

Figure 1:
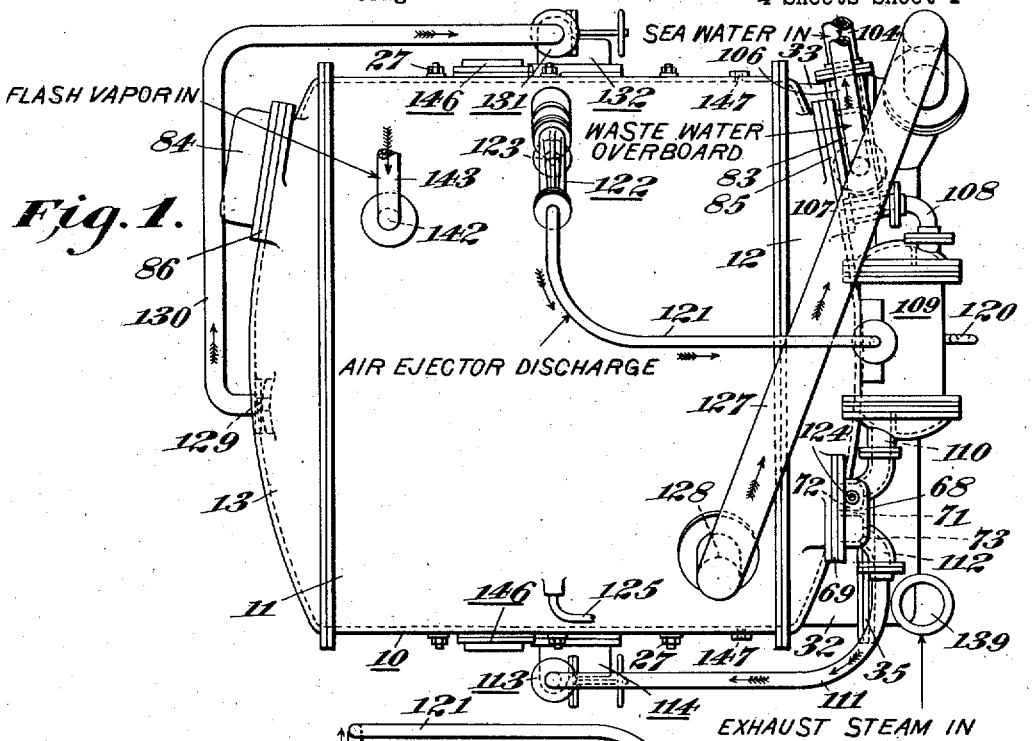
Fig. 1 is a plan view of our improved apparatus.
Figure 2:
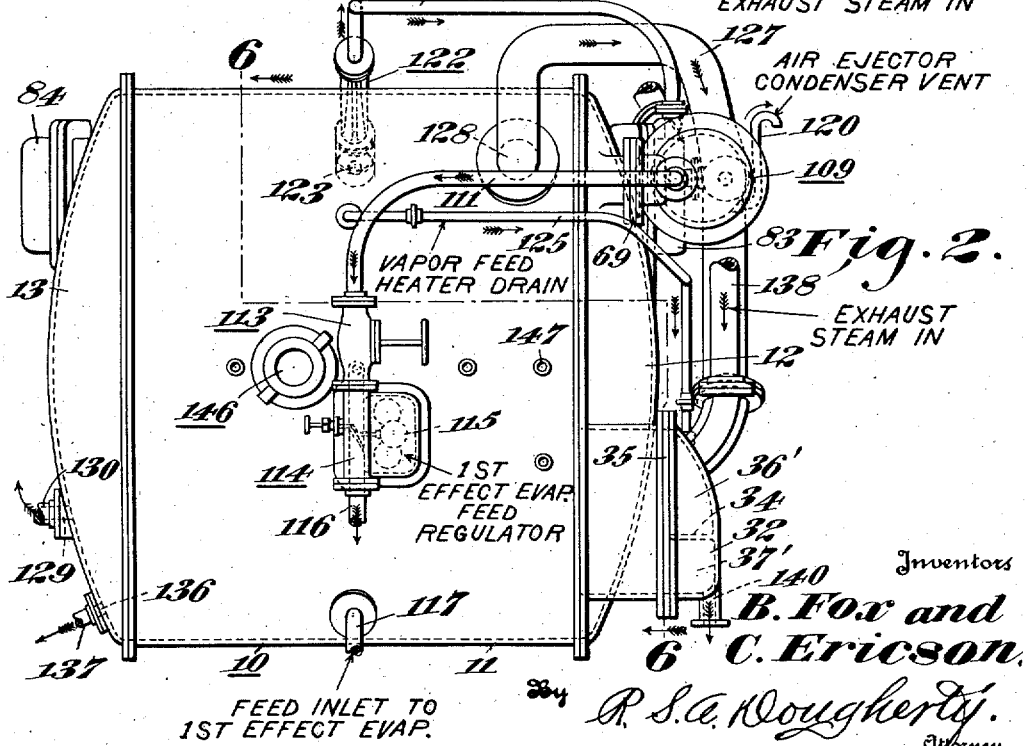
Fig. 2 is a side elevation thereof.

Referring now to the drawings, the numeral 10 designates the container shell which comprises the cylindrical casing 11, the front head 12, and the rear head 13. This structure constitutes the tank or container for the body of sea water (or other liquid) to be evaporated and distilled, and also acts as the mounting for the various units required to accomplish the said evaporation or distillation.

Figure 3:
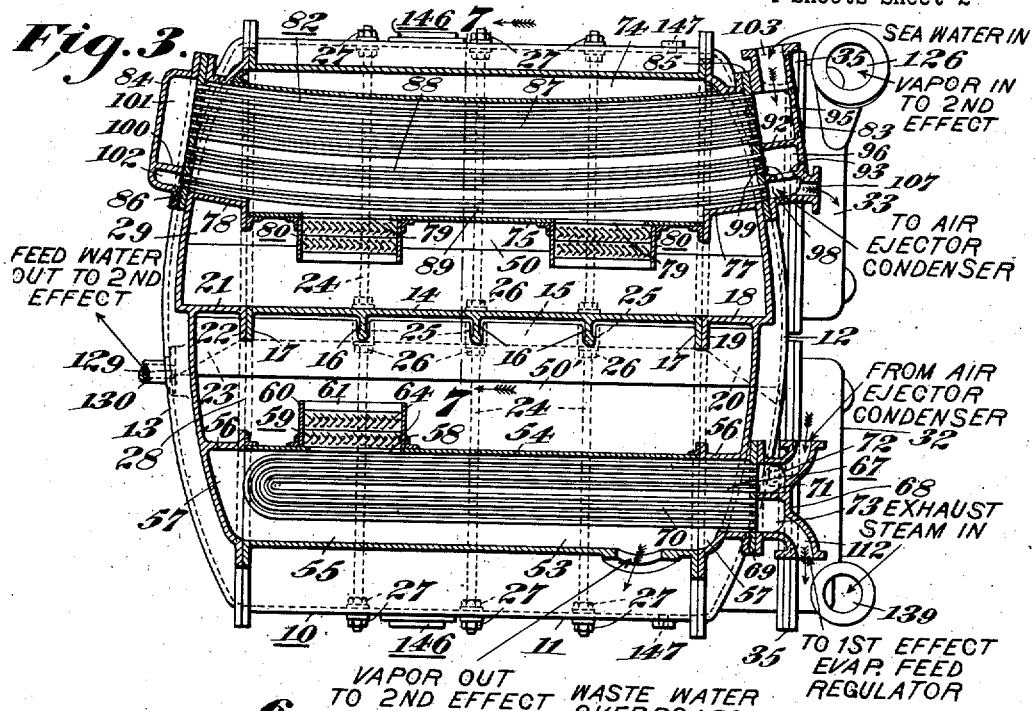
Fig. 3 is a section taken along the line 3—3 of Fig. 6 viewed in the direction of the arrows.
Figure 4:
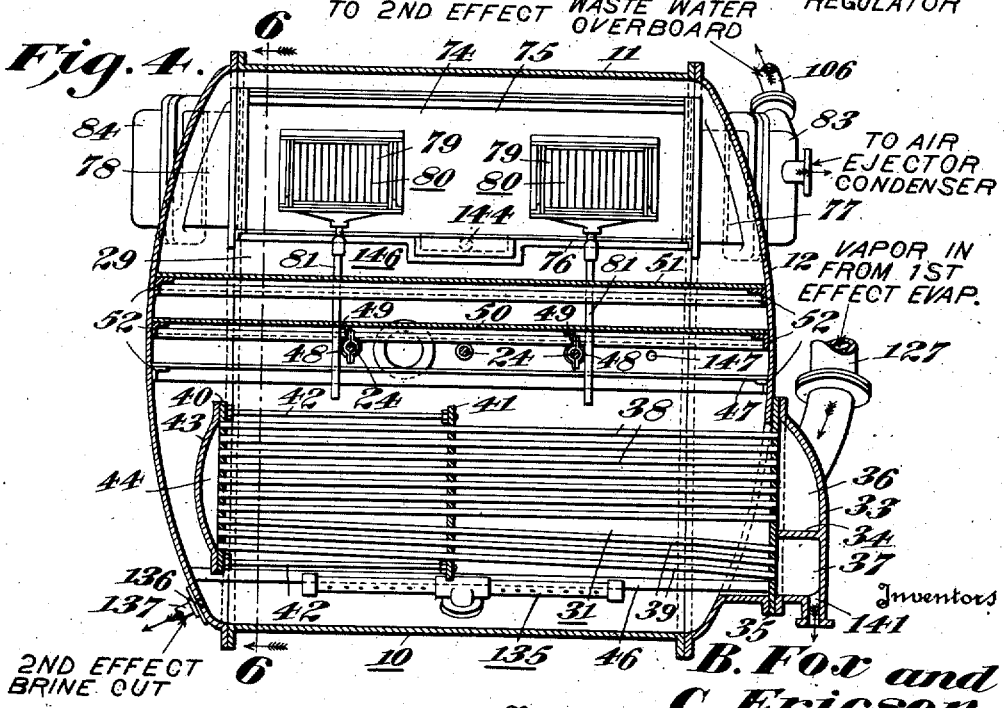
Fig. 4 is a section taken along the line 4—4 of Fig. 6 viewed in the direction of the arrows.
Figure 8:
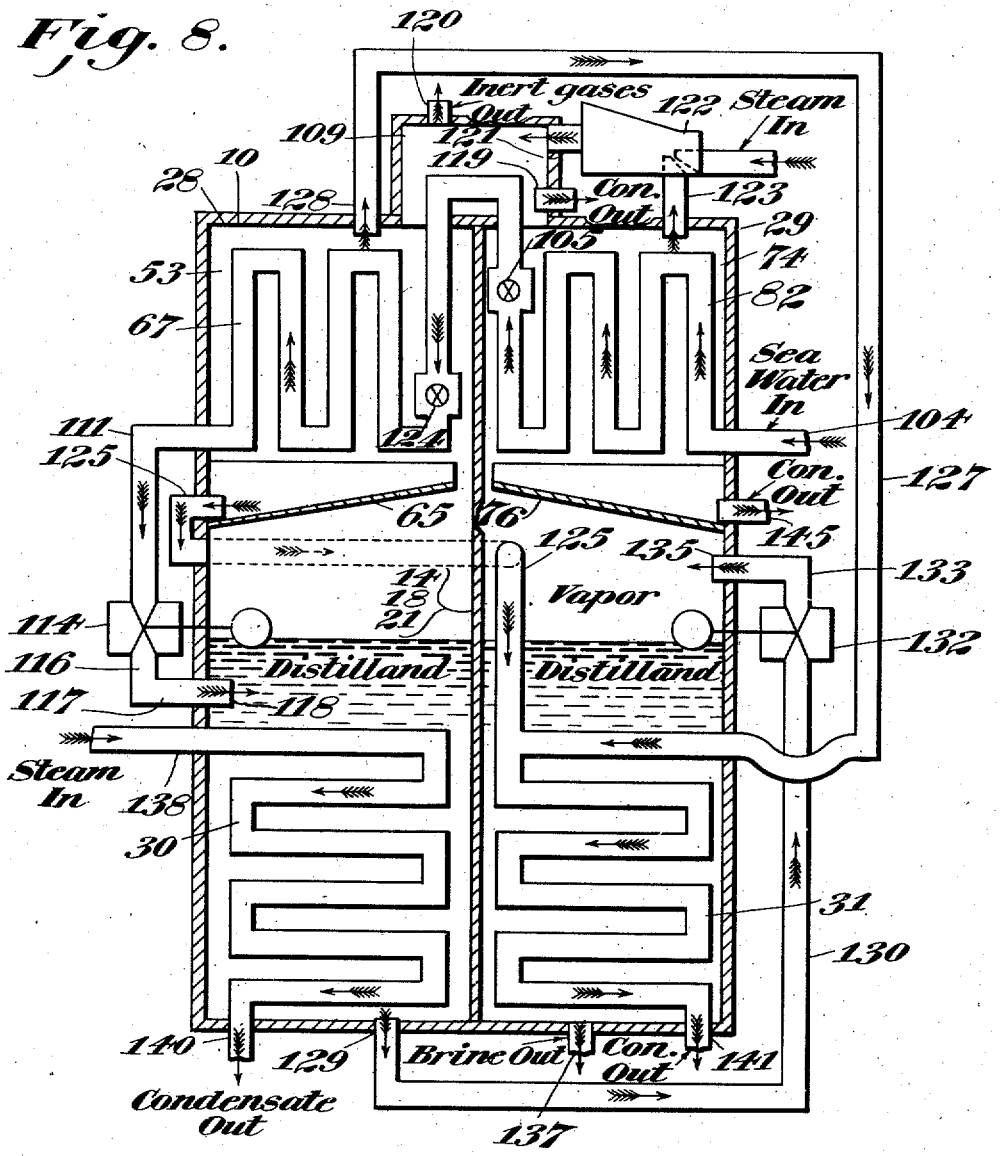
Fig. 8 is a drawing representing in diagrammatic form the flow system of the liquids to be distilled, the heating fluids therefor, and the condensate collecting means.

It may be noted in Figs. 3 and 6 that the cylindrical casing 11 is divided structurally into two halves by the vertical wall 14. The wall 14 is reinforced by the horizontal ribs 15, and by the bulbed vertical ribs 16, and the end vertical ribs 17. The front head 12 is reinforced by the vertical wall 18, the vertical rib 19, and the horizontal ribs 20; while the rear head is similarly reinforced by the members 21, 22, and 23. The ribs 17 of the casing 11 abut facially against the ribs 19 and 22. For increased strength and rigidity stay-bolts 24 extend from side to side horizontally on the center of the casing 11 and through bosses 25 on the ribs 16 and the wall 14 thereof. The stay-bolts 24 are threaded at the center for the nuts 26 and at the ends for the nuts 27, and the said nuts are adjusted thereon in such a manner that the stay-bolts 24 act both in tension and in compression to give rigidity and strength to the casing 11 and its central wall 14.

The container shell 10 is thus divided by the walls 14, 18, and 21 into two compartments or chambers, the left hand one of which as viewed in Fig. 6 we designate as the first effect evaporator chamber 28; and the right hand one we designate as the second effect evaporator chamber 29. Further sub-division of these chambers will be hereinafter described.

Contained within the lower halves of the first effect evaporator chamber 28 and of the second effect evaporator chamber 29 are the first effect heater 30 and the second effect heater 31, respectively. These heaters 30 and 31 are each integral units and are removably attached as such to the front head 12. They are practically identical in construction, though of opposite hand, with the exception of the heads 32 and 33 which because of piping arrangements are slightly different. Therefore the description of one will apply to the other. The head 33 is provided with a horizontal wall 34 which together with the front tube sheet 35 forms the enclosed chambers 36 and 37. An upper nest of tubes 38 and a lower nest of tubes 39 extend from the front tube sheet 35 to the rear tube sheet 40 and are supported intermediate the ends by a supporting tube sheet 41. The latter is held in spaced relation to the tube sheet 40 by suitable means, such as the bolts 42. A cover head 43 together with the rear tube sheet 40 forms a chamber 44 with which the rear ends of all the tubes communicate. For supporting the heaters 30 and 31 and for convenience in removing for cleaning and repair, the tracks 45 and 46 are provided on the interior of the casing 11. Suitable notches in the rear tube sheet 40 and the supporting tube sheet 41 engage the tracks 45 and 46 to locate the heater in place and to guide it upon removal or replacement. The lower nest of tubes 39 is sloped and has an additional bend downward at the front end to aid in the discharge of condensates.

Within the chambers 28 and 29 and just above the heaters 30 and 31 are the deflecting baffles 47 and 47′ which extend full length of the container shell 10 and are suitably fixed to the casing 11. Mounted on the stay-bolts 24 by means of clamping brackets 48 and angles 49 are the double troughed baffles 50 and 50′. These troughed baffles 50 and 50′ extend full length of the container shell 10 and have their longitudinal edges bent downward, inward, and upward to form troughs open for discharge at their ends. Above the baffles 50 and 50′ at each side and fixed to the casing 11 are the single troughed baffles 51 and 51′, which also extend full length of the container shell 10 and have their free edge troughed similar to the baffles 50. All the baffles 47, 47′, 50, 50′, 51, and 51′ have their free ends supported on angle brackets 52 fixed to the inner faces of the heads 12 and 13.

Within the first effect evaporator chamber 28 at the top is the vapor feed heater chamber 53 formed by the walls 54 and 55 in the casing 11, and the mating walls 56 and 57 in the heads 12 and 13. The vapor feed heater chamber 53 communicates with the first effect evaporator chamber 28 through an orifice 58 in the rear half of the vertical wall 54. Fixed to the outside face of the wall 54 and commanding the orifice 58 is the first effect vapor separator 59. The first effect vapor separator 59 comprises an open ended rectangular frame 60 having a perforated floor plate 61, beneath which is fixed a dished cover 62 having at its lower extremity an orifice in which is fixed a syphon drain pipe 63. Within the frame 60 are fixed the nested labyrinthine baffles 64. At a mid position longitudinally the floor wall 55 is depressed to form a collecting trough 65 which communicates with the exterior of the casing 11 through an orifice 66. Contained within the vapor feed heater chamber 53 is the first effect vapor feed heater 67. The heater 67 is an integral unit removably attached to the front head 12. It comprises the conduit head 68, the tube sheet 69, and the nest of return tubes 70. The conduit head 68 by reason of a dividing wall 71 forms together with the tube sheet 69 an inlet chamber 72 and an outlet chamber 73.

Within the second effect evaporator chamber 29 at the top is the distilling condenser chamber 74 formed by the walls 75 and 76 in the casing 11, and the mating walls 77 and 78 in the heads 12 and 13. The distilling condenser chamber 74 communicates with the second effect evaporator chamber 29 through the orifices 79. Fixed to the outside face of the wall 75 and commanding the orifices 79 are the second effect vapor separators 80. The separators 80 are identical in design to the separator 59 hereinbefore described and need not be further described other than to enumerate the syphon drain pipes 81.

At a mid position longitudinally the floor wall 76 is depressed to form a trough similar to that hereinbefore described for the floor wall 55 and need not be further described.

Contained within the distilling condenser chamber 74 is the distilling condenser 82. The distilling condenser 82 is a unit removably attached to the front and rear heads 12 and 13, respectively. It comprises the front conduit head 83, the rear cover head 84, the tube sheets 85 and 86, the three sets, or nests, of tubes 87, 88, and 89, and the baffles 90 and 91 (Fig. 7). The conduit head 83 by reason of dividing walls 92, 93, and 94 forms together with the tube sheet 85 the four enclosed chambers 95, 96, 97, and 98. The chambers 96 and 97 communicate one with the other by reason of an orifice 99 in the wall 93. The rear cover head 84 by reason of a dividing wall 100 forms together with the tube sheet 86 the two enclosed chambers 101 and 102.

Upon the exterior of the container shell 10 and its attached parts hereinbefore described are various pipe connections and the like which we will now describe. In the front conduit head 83 an orifice 103 communicates the chamber 95 with the pipe 104; while the orifice 105 communicates the chamber 96 with the pipe 106; and the orifice 107 communicates the chamber 98 with the pipe connection 108. Mounted upon the upper central part of the front head 12 is a standard type air ejector condenser 109 within which a nest of tubes communicate at the right end with the pipe connection 108, and at the left end these tubes communicate with the chamber 72 in the conduit head 68 by means of the orifice 110. Chamber 73 of the conduit head 68 is communicated with the pipe 111 by means of the orifice 112. The pipe 111 forms a line leading to the throttle valve 113 mounted upon the float feed regulator 114 which communicates with the first effect evaporator chamber 28 by means of the orifice 115 in the casing 11. The float feed regulator 114 communicates with the pipe 116, thence by means of the pipe 117 and the orifice 118 to the first effect evaporator chamber 28. Communicating with the interior of the air ejector condenser 109; at the bottom is the pipe 119; at the front is the pipe 120; and at the top is the pipe 121. The pipe 121 forms a line leading to the standard type air ejector 122 which communicates with the distilling condenser chamber 74 by means of the orifice 123. The chamber 72 of the conduit head 68 communicates with the pipe 124 by a suitable orifice (not shown). The pipe 125 forms a line communicating the orifice 66 with the chamber 36 by a suitable orifice in the head 33. The chamber 36 by means of the orifice 126 communicates with the pipe 127 which in turn communicates with the vapor feed heater chamber 53 by means of the orifice 128. An orifice 129 in the lower half of the rear head 13 communicates the first effect evaporator chamber 28 with the pipe 130 leading to the throttle valve 131 mounted upon the float feed regulator 132 which communicates with the second effect evaporator chamber 29 by means of a suitable orifice in the casing 11. The float feed regulator 132 communicates with the pipe 133 leading to an orifice 134 in the casing 11, which orifice communicates with a perforated pipe 135 within the second effect evaporator chamber 29. Orifice 136 at the bottom of the rear head 13 communicates the pipe 137 with the second effect evaporator chamber. The pipe 138 communicates through an orifice 139 in the head 32 with the chamber 36'. The orifice 140 in the head 32 communicates with the chamber 37'. The orifice 141 in the head 33 communicates with the chamber 37. The orifice 142 in the casing 11 communicates the chamber 74 with the pipe 143. The orifice 144 communicates the chamber 74 with the pipe 145.

On each side of the casing 11 observation windows 146 are suitably mounted by means of which a view of the interior may be obtained. Also on each side of the casing 11 are provided orifices 147 communicating with the chambers 28 and 29, respectively, for the purpose of mounting water gauge fittings (not shown).

We will now describe the operation of our improved apparatus for evaporating and distilling sea water as used on board ships. Water is pumped from the sea chest to the distilling condenser 82 by way of the pipe 104 and the orifice 103 to the chamber 95 of the front conduit head 83. From the chamber 95 the water flows rearwardly through the tube nest 87 to the chamber 101, then forwardly through the tube nest 88 to the chamber 96. Here, having served its function as a cooling agent for the distilling condenser 82, a large part of the water is automatically deflected through the orifice 105 to the discharge pipe 106 and thence overboard, while the remainder required for distilling purposes circulates through the orifice 99 to the chamber 97 and then rearwardly through the lower half of the nest of tubes 89 to the chamber 102 and back through the upper half of the nest of tubes 89 to the chamber 98. The water here leaves the distilling condenser 82 by way of the orifice 107 and the pipe connection 108 to enter the air ejector condenser 109 and passing through the tube nest therein emerges through the orifice 110 to the chamber 72 in the conduit head 68 of the vapor feed heater 67. The water circulates through the return tubes 70 to the chamber 73, leaving the vapor feed heater 67 by way of the orifice 112, to and through the pipe 111 and the throttle valve 113, and into the float feed regulator 114. The float feed regulator governs the amount of water passed onward by the height of the water within the first effect evaporator chamber 28 and is preferably a valve controlled by a float of a type well known to those skilled in the art. The water that passes is led by the pipes 116 and 117 to the orifice 118 and thence to the interior of the first effect evaporator chamber 28. In the passage of the water as just described heat has been accumulated therein from the distilling condenser 82, the air ejector condenser 109, and the vapor feed heater 67. At the same time exhaust steam from the ship's auxiliaries is flowing into and through the pipe 138 to the chamber 36' of the first effect heater 36. The steam flows from the chamber 36' through the upper tube nest 38' to the chamber 44' and back through the tube nest 39' to the chamber 37', and discharging as condensate through the orifice 140 is piped to the ship's drain tank (not shown). The exhaust steam flowing through the heater 36 is sufficient to vaporize the sea water within the chamber 28. As the vapor rises from the surface thereof it is diverted through circuitous or tortuous paths by means of the baffles 47', 50', and 51'. The rising vapor as it impinges upon the baffles 50', and 51' tends to deposit entrained water and this is gathered up by the troughed edges of the baffles and led to the ends thereof where it drops back into the main body of the water away from the area of vapor activity and thus avoids being carried along by the rising vapor. The vapor thus somewhat dried rises to the top of the chamber 28 and flows through the first effect vapor separator 59 and in passing through the tortuous pathways formed by the labyrinthine baffles 64 it is further dried. The entrained water thus removed settles upon the perforated floor plate 61 and flows through to the dished cover 62 below and thence through the syphon drain pipe 63 to discharge upon the surface of the main body of water. The vapor flows from the separator 59 into the vapor feed heater chamber 53 and flows over and around return tubes 70 thus heating the flowing feed water therein. The condensate formed from the vapor during this heating of the feed water is collected in the trough 65 and is discharged therefrom through the orifice 66 to and through the pipe 125 to the chamber 36 of the second effect heater 31. The vapor meanwhile flows outward from the chamber 53 through the orifice 128 to and through the pipe 127, and the orifice 126 into the chamber 36 of the second effect heater 31. The vapor flows from the chamber 36 through the upper tube nest 38 to the chamber 44 and back through the tube nest 39 to the chamber 37. From the chamber 37 the condensate discharges through the orifice 141 and is led by suitable piping to a standard type flash chamber (not shown) where the condensate is discharged to a condensate pump (not shown) for distribution, and the flash vapor liberated by the reduction of pressure is drawn into the distilling condenser chamber 74 through the pipe 143 and the orifice 142. The water in the second effect evaporator chamber 29 is drawn by means hereinafter described from the first effect evaporator chamber 28 through the orifice 129, the pipe 130, and the throttle valve 131, and into the float feed regulator 132. This regulator 132 is identical in function and design to the regulator 114 hereinbefore described. The water that passes through the regulator 132 is led by the pipe 133 and the orifice 134 to the perforated pipe 135 within the second effect evaporator chamber 29 at the bottom thereof. This water in the chamber 29 is vaporized by the heat of the vapor from the first effect evaporator flowing through the heater 31 as hereinbefore described. The vapor as it rises from the main body of water in the chamber 29 is acted upon by the baffles 47, 50, and 51 in a similar manner to that described for the first effect evaporator, and need not be further described. Likewise the action of the second effect vapor separators 80 is identical to that described for the first effect vapor separator 59, and need not be further described. The vapor flows from the separators 80 into the distilling condenser chamber 74 where it mingles with the flash vapor from the pipe 143 hereinbefore described. These vapors flowing over and around the distilling condenser tubes 87, 88, and 89 are largely condensed—the condensate being collected and drawn off by way of the orifice 144 and the pipe 145 to a condensate pump for distribution, while the remaining vapor is withdrawn between the baffles 90, and 91 through the orifice 123 to the air ejector 122. The air ejector 122 is functioned by a steam jet fed from a connection to the auxiliary steam line (not shown) and tends to create a vacuum in the distilling condenser chamber 74 and in the second effect evaporator chamber 29 thus acting to draw off the remaining vapor as just described and also to establish a pressure differential with respect to the first effect evaporator chamber 28, which results in maintaining the feed water pressure flow as hereinbefore described and in low pressure evaporation in the second effect evaporator chamber 29. The air ejector 122 discharges by way of the pipe 121 into the air ejector condenser 109, where, in a manner well known to the art, the non-condensing vapors are exhausted to the atmosphere through the pipe 120 and the condensate is discharged to the ship's drain tank through the pipe 119. An emergency discharge line pipe 124 with a cut-off valve 124' is provided whereby feed water from the chamber 72 of the first effect vapor feed heater 67 may be discharged overboard. A brine discharge line pipe 137 is connected to the orifice 136 whereby water in the second effect evaporator chamber 29 that has become surcharged with salt may be pumped overboard and replaced by the normal feed water as hereinbefore described.

It will now be apparent that we have devised a novel apparatus for evaporating and distilling, especially applicable to marine purposes but it will be manifest that it is useful and valuable for application to other fields. It will be readily seen from the above description that we have devised a novel heat exchange apparatus whereby the surface areas subject to heat radiation losses are reduced to a minimum by placing condensers, distillers, heaters, and the like within a single container. We have made a considerable saving in the cost and weight of individual containers and piping required; all of which makes for general compactness of design with its consequent saving in space and weight—thus complying with the most valuable desideratum in the ship building art.

It is also apparent that the container shell 10 could be of other shape than as shown and described without departing from the spirit of our invention, but we have shown it in our preferred form as being substantially cylindrical and horizontal. In this form it combines practically with a maximum of container volume and structural strength for a minimum requirement of space and weight.

Although we have described and illustrated our invention in considerable detail, we do not wish to be limited to the exact and specific details thereof as shown and described, but may use such modification in, substitution for or equivalent thereof, as are embraced within the scope of our invention or as pointed out in the claims.

Having thus described our invention, what we claim as new and desire to secure by Letters Patent is:

1. In an apparatus for evaporating and distilling, a horizontal cylindrical container shell, said container shell being divided into two substantially equal compartments by an integral vertical longitudinal wall member, said wall being strengthened by integral vertical and horizontal transverse ribs and by a plurality of stay-bolts fixed to said wall and to opposed sides of said container shell normal to said wall and to said opposed sides, one of said compartments having a vaporizing portion adapted to contain a heating unit and the liquid to be vaporized, a vapor drying portion adapted to contain vapor drying units, and a vapor condensing portion adapted to contain a vapor condenser unit, the said vaporizing portion together with the said vapor drying portion and the condensing portion being inter-communicating, the other of said compartments having a vaporizing portion adapted to contain a heating unit and the liquid to be vaporized, a vapor drying portion adapted to contain vapor drying units, and a distilling condenser portion adapted to contain a distilling condenser unit, the second mentioned vaporizing portion together with the second mentioned vapor drying portion and the said distilling condenser portion being inter-communicating, vacuum and vacuum condenser means mounted upon the said container shell in communication with the said distilling condenser portion of the second of said compartments, separate float feed regulator means mounted exteriorly of the first and second mentioned compartments in connection with each of the said vaporizing portions, piping means connected in series to the distilling condenser unit, to the vacuum condenser means, to the vapor condenser unit, to the feed regulator means of the first mentioned compartment, and to the first mentioned vaporizing portion, piping means connecting the vapor condensing portion to the second mentioned heating unit, piping means connected in series to the first mentioned vaporizing portion, to the second compartment float feed regulator, and to the second mentioned vaporizing portion, pure water drain piping means communicating with the vacuum condenser, with the first mentioned heating unit, with the second mentioned heating unit, and with the distilling condenser unit, and undistilled water drain piping means communicating with the vapor condensing unit, with the distilling condenser unit, and with the second mentioned vaporizing portion.

2. In an apparatus for evaporating and distilling, a container shell comprising a plurality of compartments, one of said compartments adapted to automatically receive the liquid to be evaporated and distilled and to contain a heater means to heat and vaporize said liquid, baffles and separator means adapted to collect condensate and return it to the body of said liquid and vapor condenser means adapted to dry said vapor and collect the condensate, and a second of said compartments adapted to automatically receive liquid from the first compartment and to contain a heater means heated by the dried vapor from the first compartment, baffles and separator means adapted to collect condensate from the vapor rising in the second compartment and return it to the body of the liquid, and distilling condenser means to collect the condensate from the latter vapor, air ejector and condenser means mounted upon said container shell to draw non-condensable vapor from the second compartment and to condense and collect the condensate thereof, and piping means mounted on the shell container to carry the condensate from the first compartment vapor condenser to the second compartment heater piping, to carry the liquid to the first compartment through the circulating tubes of the distilling condenser, the air ejector condenser, and the vapor condenser before entering the said automatic feed means, and to collect and distribute the condensate from the distilling and air ejector condensers.

3. In an apparatus for evaporating and distilling, a container shell containing a plurality of primary compartments, one of said primary compartments being divided into separate inter-communicating vaporizing and condensing compartments, another of said primary compartments being divided into separate inter-communicating vaporizing and distilling compartments, heating units contained within said vaporizing compartments and condensing units contained within said condensing and distilling compartments, piping connecting in series the feed water system to the said condensing units and to the first mentioned primary compartment, piping connecting the said condensing compartment of the first mentioned primary compartment to the heating unit of the second mentioned primary compartment, feed water piping connecting the vaporizing compartment of the first mentioned primary compartment to the vaporizing compartment of the second mentioned primary compartment, and vacuum means mounted on the container shell and connected to said distilling compartment whereby a pressure differential is maintained between the first mentioned primary compartment and the second mentioned primary compartment.

4. A multiple effect evaporating and distilling apparatus, comprising a first compartment and a second compartment within a single container, each of said compartments being adapted to contain a body of liquid separated by a common wall, each of said compartments having a liquid vaporizing portion and a vapor condensing portion, heater means within said first compartment for heating and vaporizing liquid therein, means for conveying feed liquid in preheat heat interchanging relationship successively with vapor in the vapor condensating portion of said second compartment and the vapor condensating portion of said first compartment whereby said vapors in both compartments are condensed while preheating said feed liquid, means for conveying feed liquid thus preheated into the liquid vaporizing portion of said first compartment, means for conveying heated liquid from said first compartment into said second compartment, means for conveying vapor from said first compartment into heat interchanging relationship with the liquid in said second compartment for vaporizing liquid therein, means for collecting for use condensates formed in both said first and said second compartments, and vacuum inducing means in communication with the vapor condensing portion of said second compartment whereby a vapor pressure differential is maintained between said first compartment and said second compartment.

5. A multiple effect evaporating and distilling apparatus, comprising a first compartment and a second compartment within a single container each of said compartments being adapted to contain a body of liquid separated by a common wall, each of said compartments having a liquid vaporizing portion and a vapor condensing portion, heater means within said first compartment for heating and vaporizing liquid therein, means for conveying feed liquid in preheat heat interchanging relationship successively with vapor in the vapor condensating portion of said second compartment and the vapor condensating portion of said first compartment whereby said vapors in both compartments are condensed while preheating said feed liquid, means for conveying feed liquid thus preheated into the liquid vaporizing portion of said first compartment, means for conveying heated liquid from said first compartment into said second compartment, means for conveying vapor from said first compartment into heat interchanging relationship with the liquid in said second compartment for vaporizing liquid therein, means for collecting for use condensate formed in the vapor condensing portion of said second compartment, and vacuum inducing means in communication with the vapor condensing portion of said second compartment whereby a vapor pressure differential is maintained between said first compartment and said second compartment.

6. A multiple effect evaporating and distilling apparatus, comprising a first compartment and a second compartment within a single container, each of said compartments being adapted to contain a body of liquid separated by a common wall, each of said compartments having a liquid vaporizing portion and a vapor condensing portion, heater means within said first compartment for heating and vaporizing liquid therein, means for conveying feed liquid in preheat heat interchanging relationship successively with vapor in the vapor condensating portion of said second compartment and the vapor condensating portion of said first compartment whereby said vapors in both compartments are condensed while preheating said feed liquid, means for conveying feed liquid thus preheated into the liquid vaporizing portion of said first compartment, means for conveying heated liquid from said first compartment into said second compartment, means for conveying vapor from said first compartment into heat interchanging relationship with the liquid in said second compartment for vaporizing liquid therein, means for collecting condensate formed in the vapor condensing portion of said first compartment and conveying it to said means for conveying vapor to said second compartment, means for collecting for use the condensate formed in the vapor condensing portion of said second compartment, and vacuum inducing means in communication with the vapor condensing portion of said second compartment whereby a vapor pressure differential is maintained between said first compartment and said second compartment.

7. A multiple effect evaporating and distilling apparatus, comprising a first compartment and a second compartment within a single container, each of said compartments being adapted to contain a body of liquid separated by a common wall, each of said compartments having a liquid vaporizing portion and a vapor condensing portion, heater means within said first compartment for heating and vaporizing liquid therein, means for conveying feed liquid in preheat heat interchanging relationship successively with vapor in the vapor condensating portion of said second compartment and the vapor condensating portion of said first compartment whereby said vapors in both compartments are condensed while preheating said feed liquid, means for conveying feed liquid thus preheated into the liquid vaporizing portion of said first compartment, means for conveying heated liquid from said first compartment into said second compartment, means for conveying vapor from said first compartment into heat interchanging relationship with the liquid in said second compartment for vaporizing liquid therein, means for collecting for use condensate formed in the vapor condensing portion of said second compartment, and means for maintaining a vapor pressure differential between the two compartments.

8. In apparatus for distilling a liquid, a single container, wall means within said container dividing the same into a first compartment and a second compartment so as to form separate distilling effects, heater means in each of said compartments each comprising a conduit for conducting fluids in heat exchanging relation with liquid to be evaporated in said compartments, a first condenser chamber connected to receive vapor from said first compartment, a second condenser chamber connected to receive vapor from said second compartment, means for conducting liquid to be distilled, successively in heat exchanging relation with vapor in the second condenser chamber and with vapor in the first condenser chamber and then into said first compartment, means for supplying a heating fluid into the conduit of the heater means in said first compartment whereby the liquid therein is evaporated and some of the vapor evolved is condensed in the first condenser chamber by heat exchange with the conducting means of the incoming liquid, conduit means for conducting residuum liquid from said first compartment to said second compartment, conduit means for conducting uncondensed vapor from the first condenser chamber into the conduit of the heater means of said second compartment whereby the liquid in said second compartment is evaporated and the vapor so evolved is condensed in the second condenser chamber, means for collecting for use condensates formed in said condenser chambers, and vapor exhausting means communicating with said second condenser chamber.

9. In apparatus for distilling a liquid, a single cylindrical container, a substantially vertical diametrically extending wall within said container dividing the same into a first compartment and a second compartment so as to form separate distilling effects, heater means in each of said compartments each comprising a conduit for conducting fluids in heat exchanging relation with liquid to be evaporated in said compartments, a first condenser chamber connected to receive vapor from said first compartment, a second condenser chamber connected to receive vapor from said second compartment, means for conducting liquid to be distilled, successively in heat exchanging relation with vapor in the second condenser chamber and with vapor in the first condenser chamber and then into said first compartment, means for supplying a heating fluid into the conduit of the heater means in said first compartment whereby the liquid therein is evaporated and some of the vapor evolved is condensed in the first condenser chamber by heat exchange with the conducting means of the incoming liquid, conduit means for conducting residuum liquid from said first compartment to said second compartment, conduit means for conducting uncondensed vapor from the first condenser chamber into the conduit of the heater means of said second compartment whereby the liquid in said second compartment is evaporated and the vapor so evolved is condensed in the second condenser chamber, means for collecting for use condensates formed in said condenser chambers, and vapor exhausting means communicating with said second condenser chamber.

10. In apparatus for distilling a liquid, a first distilling effect comprising a first compartment and a second distilling effect comprising a second compartment, heater means in each of said compartments each comprising a conduit for conducting fluids in heat exchanging relation with liquid to be evaporated in said compartment, a first condenser chamber connected to receive vapor from said first compartment, a second condenser chamber in said second compartment disposed above said heater means therein and connected to receive vapor evolved therein, means for conducting liquid to be distilled, successively in heat exchanging relation with vapor in the second condenser chamber and with vapor in the first condenser chamber and then into said first compartment, means for supplying a heating fluid into the conduit of the heater means in said first compartment whereby the liquid therein is evaporated and some of the vapor evolved is condensed in the first condenser chamber by heat exchange with the conducting means of the incoming liquid, conduit means for conducting residuum liquid from said first compartment to said second compartment, conduit means for conducting uncondensed vapor from the first condenser chamber into the conduit of the heater means of said second compartment whereby the liquid in said second compartment is evaporated and the vapor so evolved is condensed in the second condenser chamber, means for collecting for use condensates formed in said condenser chambers, and vapor exhausting means communicating with said second condenser chamber.

11. In apparatus for distilling a liquid, a first distilling effect comprising a first compartment and a second distilling effect comprising a second compartment, heater means in the lower portion of each of said compartments each comprising a conduit for conducting fluids in heat exchanging relation with liquid to be evaporated in said compartments, a first condenser chamber connected to receive vapor from a point above the heater means in said first compartment, a second condenser chamber connected to receive vapor from a point above the heater means in said second compartment, at least one of said condenser chambers being disposed within the compartment from which it receives vapor, means for conducting liquid to be distilled, successively in heat exchanging relation with vapor in the second condenser chamber and with vapor in the first condenser chamber and then into the lower portion of said first compartment, means for supplying a heating fluid into the conduit of the heater means in said first compartment whereby the liquid therein is evaporated and some of the vapor evolved is condensed in the first condenser chamber by heat exchange with the conducting means of the incoming liquid, conduit means for conducting residuum liquid from the lower portion of said first compartment to the lower portion of said second compartment, conduit means for conducting uncondensed vapor from the first condenser chamber into the conduit of the heater means of said second compartment whereby the liquid in said second compartment is evaporated and the vapor so evolved is condensed in the second condenser chamber, means for collecting for use condensates formed in said condenser chambers, and vapor exhausting means communicating with said second condenser chamber.

12. In apparatus for distilling a liquid, a first distilling effect comprising a first compartment, and a second distilling effect comprising a second compartment, heater means in each of said compartments each comprising a conduit for conducting fluids in heat exchanging relation with liquid to be evaporated in said compartments, a first condenser chamber connected to receive vapor from said first compartment, a second condenser chamber connected to receive vapor from said second compartment, at least one of said condenser chambers being disposed within the compartment from which it receives vapor, means for conducting liquid to be distilled, successively in heat exchanging relation with vapor in the second condenser chamber and with vapor in the first condenser chamber and then into said first compartment, means for supplying a heating fluid into the conduit of the heater means in said first compartment whereby the liquid therein is evaporated and some of the vapor evolved is condensed in the first condenser chamber by heat exchange with the conducting means of the incoming liquid, conduit means for conducting residuum liquid from said first compartment to said second compartment, conduit means for conducting uncondensed vapor from the first condenser chamber into the conduit of the heater means of said second compartment whereby the liquid in said second compartment is evaporated and the vapor so evolved is condensed in the second condenser chamber, means for collecting for use condensates formed in said condenser chambers, and vapor exhausting means communicating with said second condenser chamber.

13. In apparatus for distilling a liquid, a single container, wall means within said container dividing the same into a first compartment and a second compartment so as to form separate distilling effects, heater means in each of said compartments each comprising a conduit for conducting fluids in heat exchanging relation with liquid to be evaporated in said compartments, a first condenser chamber connected to receive vapor from said first compartment, a second condenser chamber connected to receive vapor from said second compartment, means for conducting cooling liquid in excess of distilland requirements in heat exchanging relation with vapor in the second condenser chamber, means for discharging said excess from said distilling apparatus, means for conducting said distilland requirement liquid in heat exchanging relation with vapor in the first condenser chamber and then into said first compartment, means for supplying a heating fluid into the conduit of the heater means in said first compartment whereby the distilland therein is evaporated and some of the vapor evolved is condensed in the first condenser chamber by heat exchange with the conducting means of the incoming distilland, conduit means for conducting residuum distilland from said first compartment to said second compartment, conduit means for conducting uncondensed vapor from the first condenser chamber into the conduit of the heater means of said second compartment whereby the distilland in said second compartment is evaporated and the vapor so evolved is condensed in the second condenser chamber, means for collecting for use condensates formed in said condenser chambers, and vapor exhausting means communicating with said second condenser chamber 14. In apparatus for distilling a liquid, a first effect distilling unit, a second effect distilling unit, each of said units comprising a container having a transverse cross-section defined by a substantially semi-circular segment, the walls of the respective containers defined by the cord of the segment being in juxtaposition with one another, heater means in the lower portion of each of said distilling units each comprising a conduit for conducting fluid in heat exchanging relation with liquid to be evaporated in said distilling units, a first effect condenser chamber connected to receive vapor formed in said first effect distilling unit, a second effect condenser chamber connected to receive vapor formed in said second effect distilling unit, means for conducting liquid to be distilled in heat exchanging relation with vapor in the first effect condenser chamber and then into the lower portion of said first effect distilling unit, means for conveying a cooling fluid through said second effect condenser chamber, means for supplying a heating fluid into the conduit of the heater means in the lower portion of said first effect distilling unit whereby the liquid therein is evaporated and some of the vapor evolved is condensed in the first effect condenser chamber by heat exchange with the conducting means of the incoming liquid, conduit means for conducting residuum liquid from said first effect distilling unit to said second effect distilling unit, conduit means for conducting uncondensed vapors from the first effect condenser chamber into the conduit of the heater means in the lower portion of said second effect distilling unit whereby the liquid in said second effect distilling unit is evaporated and the vapor so evolved is condensed in the second effect condenser chamber, means for collecting for use condensates formed in said condenser chambers, and vapor exhausting means communicating with said second condenser chamber.

15. In apparatus for distilling a liquid, a first effect distilling unit, a second effect distilling unit, each of said units comprising a container having a transverse cross-section defined by a substantially semi-circular segment, the walls of the respective containers defined by the cord of the segment being in juxtaposition with one another, heater means in the lower portion of each of said distilling units each comprising a conduit for conducting fluid in heat exchanging relation with liquid to be evaporated in said distilling units, a first effect condenser chamber connected to receive vapor formed in said first effect distilling unit, a second effect condenser chamber connected to receive vapor formed in said second effect distilling unit, means for conducting liquid to be distilled, successively in heat exchanging relation with vapor in the second effect condenser chamber and with vapor in the first effect condenser chamber and then into the lower portion of said first effect distilling units, means for supplying a heating fluid into the conduit of the heater means in the lower portion of said first effect distilling unit whereby the liquid therein is evaporated and some of the vapor evolved is condensed in the first effect condenser chamber by heat exchange with the conducting means of the incoming liquid, conduit means for conducting residuum liquid from said first effect distilling unit to said second effect distilling unit, conduit means for conducting uncondensed vapors from the first effect condenser chamber into the conduit of the heater means in the lower portion of said second effect distilling unit whereby the liquid in said second effect distilling unit is evaporated and the vapor so evolved is condensed in the second effect condenser chamber, means for collecting for use condensates formed in said condenser chambers, and vapor exhausting means communicating with said second condenser chamber.

16. In apparatus for distilling a liquid, a first compartment and a second compartment forming separate distilling effects, heater means in each of said compartments each comprising a conduit for conducting fluids in heat exchanging relation with liquid to be evaporated in said compartment, a condenser chamber connected to receive vapor from one of said compartments, means for conducting liquid to be distilled in heat exchanging relation with vapor in said condenser chamber and then into said first compartment, means for supplying a heating fluid into the conduit of the heater means in said first compartment whereby the liquid therein is evaporated, conduit means for conducting residuum liquid from said first compartment to said second compartment, conduit means for conducting vapor from said first compartment into the conduit of the heater means of said second compartment whereby the liquid in said second compartment is evaporated and the vapor so evolved is condensed in said condenser chamber, means for collecting for use condensate formed in the vapor condensing portion of said second compartment, and vapor exhausting means communicating with said condenser chamber.

BENJAMIN FOX.
CHARLES E. ERICSON.